March 13, 1962 R. E. RICHARDSON 3,024,572
GLASS TEMPERING APPARATUS
Filed Feb. 6, 1958 5 Sheets-Sheet 1

RONALD E. RICHARDSON
BY Cushman, Darby & Cushman
ATTORNEYS

March 13, 1962  R. E. RICHARDSON  3,024,572
GLASS TEMPERING APPARATUS
Filed Feb. 6, 1958  5 Sheets-Sheet 3

RONALD E. RICHARDSON

BY: Cushman, Darby & Cushman
ATTORNEYS

March 13, 1962 R. E. RICHARDSON 3,024,572
GLASS TEMPERING APPARATUS
Filed Feb. 6, 1958 5 Sheets-Sheet 4
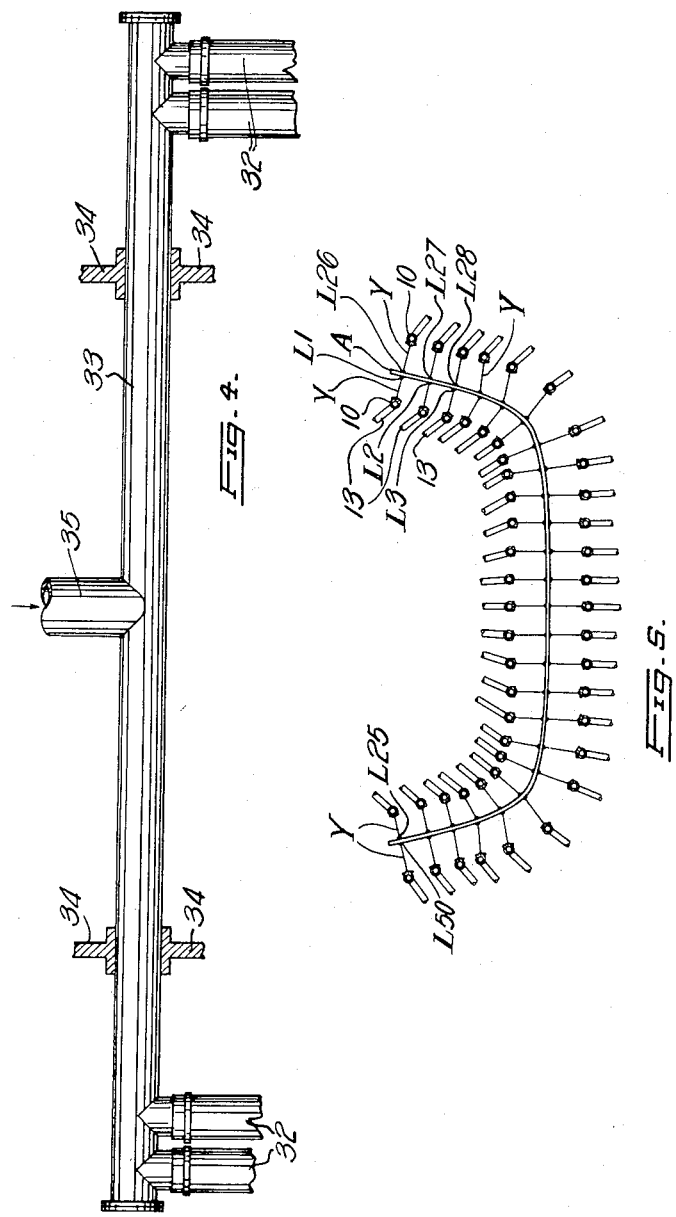
RONALD E. RICHARDSON
BY Cushman, Darby & Cushman
ATTORNEYS

RONALD E. RICHARDSON

BY Cushman, Darby & Cushman
ATTORNEYS 3,024,572
Patented Mar. 13, 1962

3,024,572
GLASS TEMPERING APPARATUS
Ronald E. Richardson, Oshawa, Ontario, Canada, assignor to Pittsburgh Plate Glass Company, Pittsburgh, Pa.
Filed Feb. 6, 1958, Ser. No. 713,739
Claims priority, application Canada Dec. 19, 1957
2 Claims. (Cl. 49—45)

This invention relates to improvements in glass tempering apparatus for use in the manufacture of tempered safety glass.

Such treatment involves the heating of each glass sheet individually in a furnace, with subsequent rapid cooling effected by the application of a large number of small jets of cold air that are caused to play on the surfaces of the glass. In known machines for carrying out this treatment, the glass sheet may be held either vertically or horizontally, after being withdrawn from the furnace, and in either case will be positioned between a pair of blowing frames each of which includes a large number of closely spaced, generally parallel air nozzles. These frames are mounted so that jets of air issuing from the nozzles strike each of the two surfaces of the glass sheet substantially normally to the plane of the surface. The spacing between the nozzles of each frame and the adjacent glass surface is usually of the order of a few inches, say 6 inches.

The object of the present invention is to provide improvements in glass tempering apparatus of this type, and in particular to provide improved blowing frames.

More specifically, it is an object of the invention to provide a blowing frame in which the passageways forming the nozzles are so arranged as to cause the air streams issuing therefrom to impinge on the adjacent glass surface in a pattern substantially uniformly distributed over such surface.

To obtain satisfactory tempering, it is important to provide for ready escape of the heated air that has very recently been in contact with the hot glass surface. If this air cannot escape rapidly, the new cold air issuing from the nozzles does not come into adequate cooling contact with the glass surface, since the warm air that cannot escape tends to form a cushion protecting such surface. This condition is known as "snuffing."

It is an object of the invention to minimize snuffing by providing improved facilities for escape of warm spent air, and to accomplish this object without producing deleterious effects on the tempering operation itself, or the quality of the glass tempered on the apparatus.

The nozzles on a blowing frame must be comparatively close together, if they are to provide for complete coverage of the glass surface, from which it follows that there can only be a limited amount of space between nozzles for escape of the spent air. The present invention provides a structure in which the jets of cold air are maintained comparatively close together for good coverage of the glass surface, while at the same time improved facilities are provided for the escape of warm spent air.

Another aspect of the present invention is the provision of improvements in respect of apparatus employed for tempering sharply bent glass. In many glass tempering machines it is arranged for each of the blowing frames to be subjected to a rotary oscillation or orbital movement so that the local area of the sheet receiving each jet of air is continuously varying as the frames move. The diameter of the orbits in which each nozzle moves has generally been of the order of 2½ to 4 inches, which is of a similar order of magnitude to the spacing between adjacent nozzles. The orbital oscillation enables the air to be played over the entire surface of the glass, with a slight effective overlap on the glass, without requiring overlap between adjacent air streams. For example, in a typical installation, a nozzle spacing of 2" has been used in combination with a 2¾" diameter of orbit.

Orbital oscillation thus provides a solution to the problem presented by the need for wide nozzle spacing (to avoid snuffing) parallel with the need for adequate coverage by the air streams of the entire glass surface, but it does introduce certain disadvantages, particularly mechanical complexity. Oscillation was not a serious problem, however, while glass shapes remained comparatively flat, but now that sharply bent tempered safety glass has become commonplace for the rear windows of automobiles, difficulty has begun to be experienced in glass tempering machines. It will be apparent that, with the various portions of the glass that lie in different planes having substantial relative inclination, oscillation in a single plane, while satisfactory for some of the jets, will inevitably be unsatisfactory for others, having the effect of moving the jets more towards and away from the glass than in a plane parallel with the glass surface. The required "throw" of the air streams is consequently varied continuously and inadequate lateral coverage of the glass surface is obtained. These undesirable effects become less and less pronounced the more the diameter of oscillation can be reduced, and the ideal situation is the complete avoidance of any need for oscillation.

It is one of the objects of the present invention to provide improvement in this regard, i.e. the provision of a blowing frame structure that will produce a satisfactory coverage of the glass surfaces without introducing serious snuffing, but with a small diameter of oscillation in comparison with prior frames and preferably with no oscillation at all. This object of the invention may be expressed as a requirement for the provision of a method by which oscillation can be dispensed with or minimized, without significant loss of quality in the finished product.

To be able to dispense with oscillation is obviously a desirable aim, if for no other reason than to eliminate the moving parts involved and simplify the apparatus. But more important than this are the afore-mentioned difficulties that oscillation introduces when the glass shape is complicated. Attempts have been made to provide compound oscillatory motions for frames used in tempering complex bent glass parts, and although these attempts have been technically successful, the frames so made are subject to high initial cost and high maintenance in service. The possibility of being able to reduce or dispense completely with oscillation is very attractive to a manufacturer of tempered safety glass.

Further problems are presented to the manufacturer of tempered bent glass for the automobile industry by the minor changes that are made annually in the shape of the glass as a result of design changes in the automobiles themselves. A blowing frame is designed to have a life of many years and much inconvenience is caused if every year the apparatus has to be rebuilt to accommodate a new shape of glass.

It is thus a further object of the invention to provide glass tempering apparatus having a structure especially adapted for flexibility in respect of glass shape, that is to say apparatus that is capable of ready adjustment to conform to minor variations of glass shape without the need for major structural modification of the equipment.

The accompanying drawings illustrate by way of example one form of glass tempering apparatus constructed in accordance with the present invention. In these drawings:

FIGURE 4 is an upward continuation of FIGURE 3;

FIGURE 5 is a diagrammatic fragment of FIGURE 1;

Figure 1:
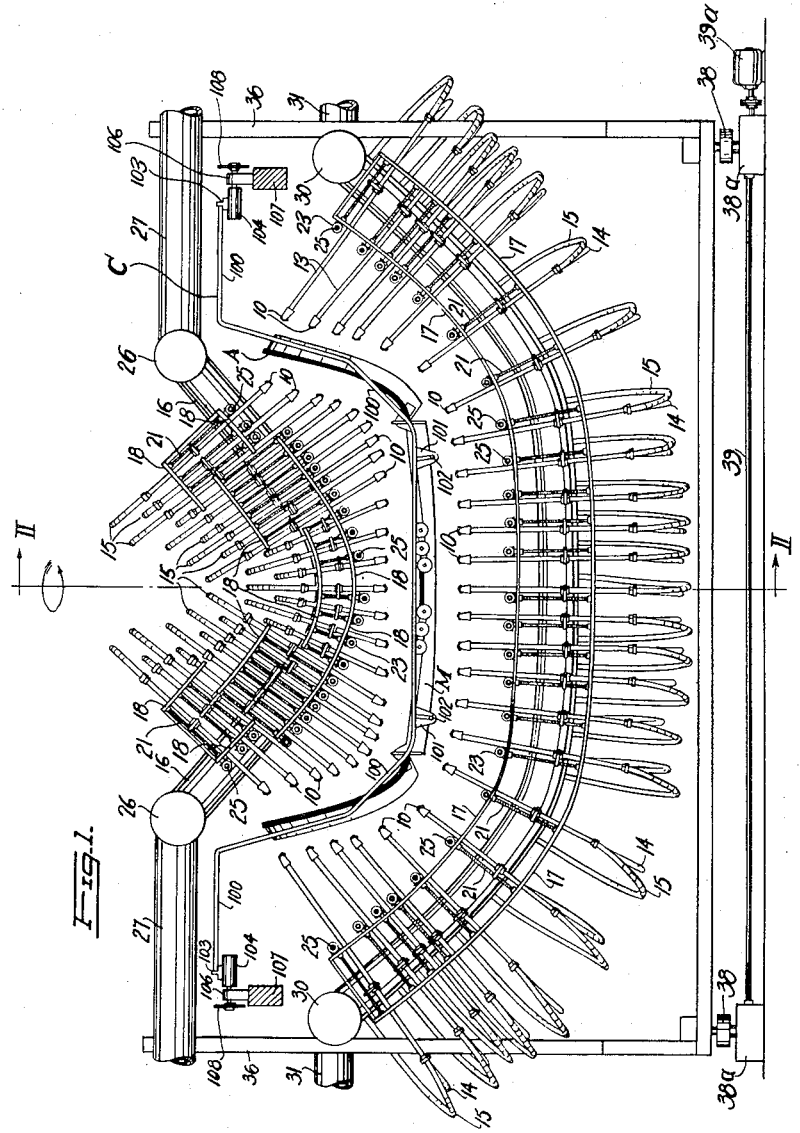
FIGURE 1 shows a front view of the entire apparatus, as seen from the right hand side of FIGURE 2.
Figure 2:
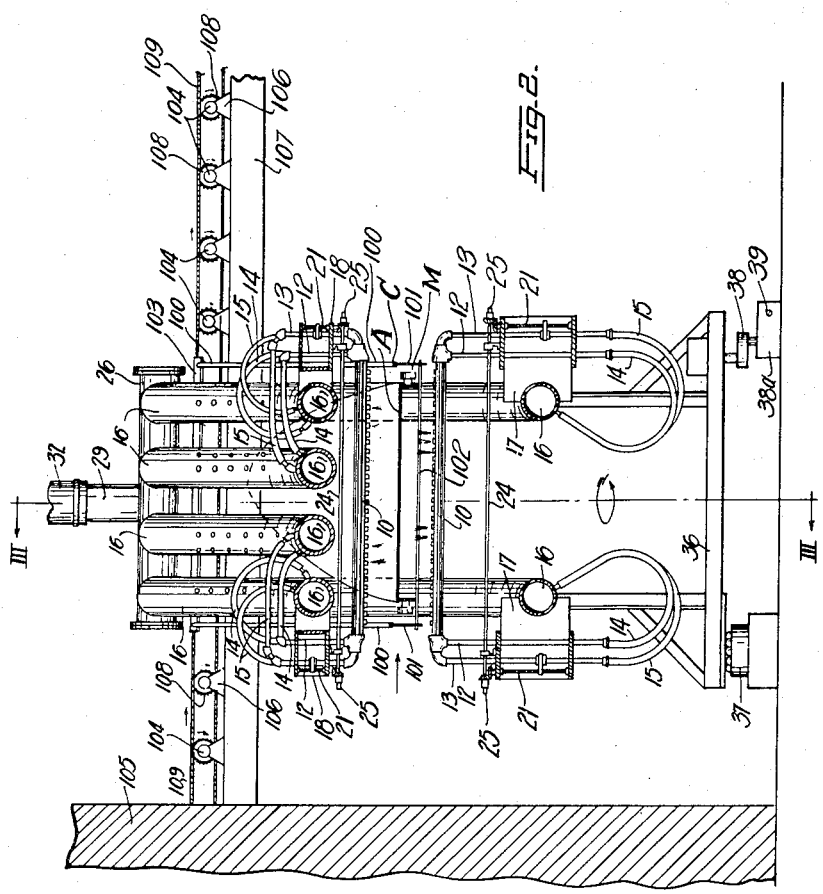
FIGURE 2 is a central transverse section of the apparatus taken on the line II—II in FIGURE 1.
Figure 3:
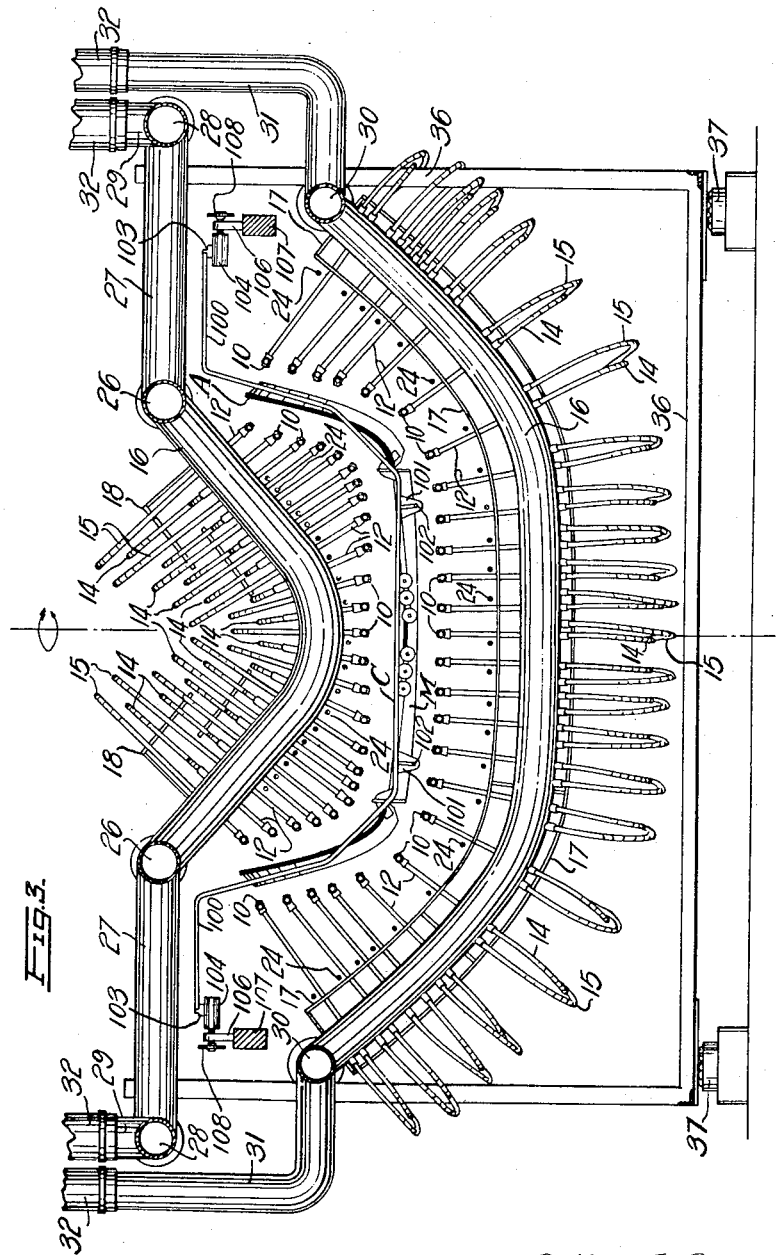
FIGURE 3 is a central lateral section taken on the line III—III in FIGURE 2.

Referring to FIGURES 1 to 6, the apparatus will be seen to comprise two blowing frames, the functional essentials of which are two series of spaced parallel air supply pipes 10 arranged to define between the two series a space in which a glass sheet A to be tempered is supported on a glass bending mould M.

Each of the pipes 10 is pivotally mounted at each end in a combination union and socket 11 (see especially FIGURE 6), whereby such pipe is mounted for pivotal movement about its own longitudinal axis and its ends are connected for air supply to the inner extremity of each of a spaced pair of feeder pipes 12 and 13. The latter are further connected respectively by flexible hoses 14 and 15 at their outer extremities to main air supply conduits 16. The feeder pipes 12 and 13 serve also as structural supports for the blowing air pipes 10, these feeder pipes 12 and 13 being slidably mounted in frames 17 and 18 on the respective sides of the glass. Each feeder pipe 13 is provided with a pair of closely spaced collars 19 that serve to confine between them a bracket member 20 which includes a threaded hole engaged by a threaded rod 21 mounted in a respective frame 17 or 18, each rod 21 carrying at one end a bevel gear 22 meshing with a further bevel gear 23 on a spindle 24. A separate spindle 24 is associated with each air supply pipe 10 and extends the full distance across the apparatus so as to move both ends of its associated air supply pipe 10 simultaneously. Each spindle 24 is fitted with flattened end portions 25 suitable for engagement by a hollow key whereby an individual air supply pipe 10 may be moved towards or away from the glass sheet independently of the remaining such pipes.

The frame parts 17 and 18 are secured to air supply conduits 16 which also function as frame members. On each side of the apparatus the four air supply conduits 16 associated with the upper blowing frame (FIGURE 2) are joined together by a common header 26 which in turn is supplied with air by a pair of combination pipe and frame members 27 connected to a further header 28 (FIGURE 3) and an elbow pipe 29. In a similar fashion the air supply conduits 16 associated with the lower blowing frame are supplied at each end through a header 30 and a further pipe 31 which includes an elbow bend so as to extend upwardly to lie adjacent the pipe 29 supplying the upper blowing frame. Pipes 29 and 31 on both sides of the apparatus are joined by flexible hoses 32 to a main air supply header 33 (see FIGURE 4) mounted above the tempering apparatus in fixed frame members 34. Air under pressure is supplied through pipe 35 from a reservoir and compressor installation (not shown).

Figure 6:
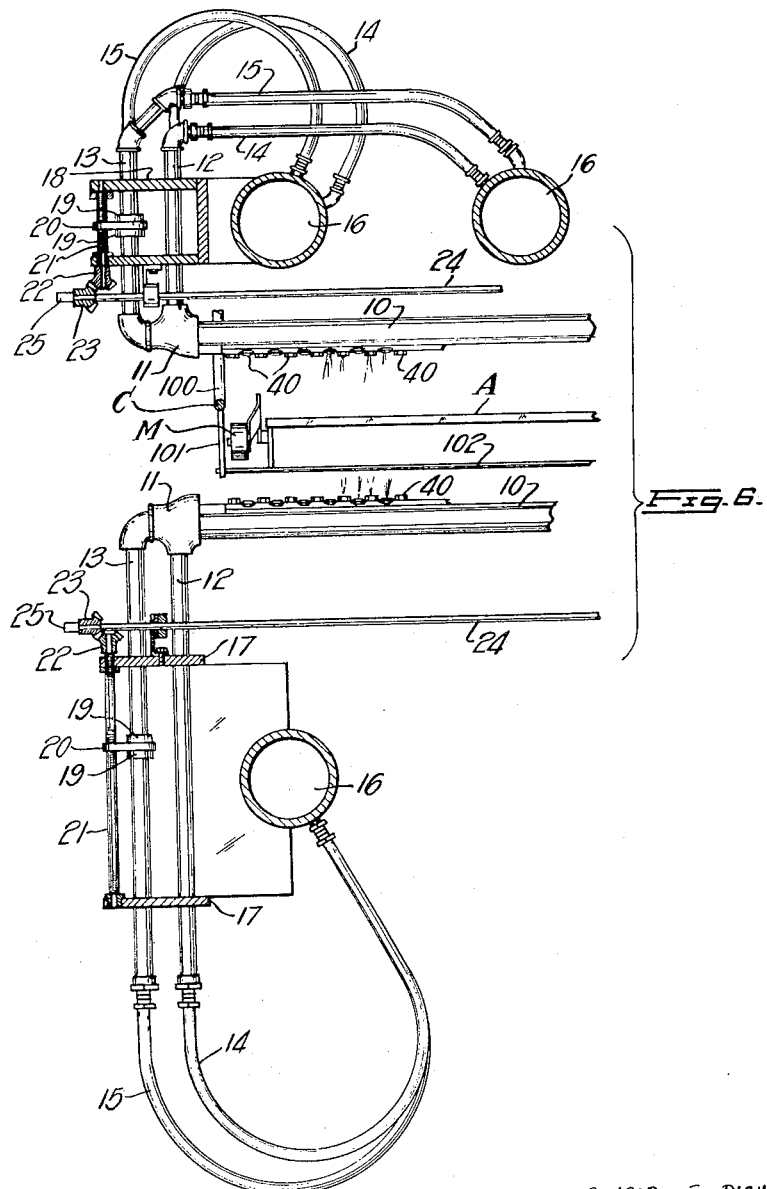
FIGURE 6 is a fragmentary view of a portion of FIGURE 2 shown on an enlarged scale.

The pipes 27 and 31 are secured to an oscillating main frame 36 mounted at the rear on ball mountings 37 and at the front on eccentric mountings 38 driven through gearing 38a and shaft 39 from a motor 39a. Each air supply pipe 10 is provided with a plurality of spaced, aligned apertures forming nozzles 40 extending through a wall thereof as shown in FIG. 6.

The mould M on which the glass A is mounted is supported in a carrier C which consists of a pair of spaced members 100 between which the mould M is slung by means of slotted arms 101 depending from the members 100 and transverse rods 102 secured to the mould and extending into the slots in the arms 101. The central portions of the carrier members 100 are straight and horizontal, but the end portions are bent upwards to conform generally to the shape of the mould when in its curved orientation (after bending of the glass) and thus also to conform to the shape of the space that the two blowing frames define between them, the extreme ends of both the carrier members 100 projecting horizontally outwardly to be joined together to complete a closed frame by transverse members 103. These members 103 lie along a plurality of rollers 104 that extend in two series (one on each side of the apparatus) from a furnace 105 (FIGURE 2) through which the glass will have travelled prior to tempering. Rollers 104 are supported on bearings 106 mounted on horizontal beams 107 which are fixed in relation to the furnace and the floor so that the blowing frames oscillate around them and hence relatively to the glass. Rollers 104 are driven through sprockets 108 by chains 109 by motors (not shown).

The plane of orbital oscillation of the main frame 36 and hence the two blowing frames is horizontal and thus parallel with the central portion of the glass sheet A. It follows that the air pipes 10 playing air onto the bent-up ends of the glass A will move partly towards and away from the glass as well as partly parallel to its surface. The diameter of oscillation is therefore kept to a minimum, for the reasons explained above.

Experimental use of the apparatus described and illustrated herein has shown that satisfactory tempered glass can be manufactured without running the motor 39a, i.e. without any oscillation at all, when the glass sheet is of comparatively small size. With the larger sizes of glass sheet, oscillation has been found desirable, but entirely satisfactory tempered glass has been manufactured with an oscillation diameter of from one inch to one and a half inches, depending on the complexity of glass shape. With large and extremely sharply bent glass and the consequent large moulds, mould shielding problems may require an oscillation diameter of one and a half inches. This is a significant improvement over the two and three quarter inch diameter oscillation found to be the minimum acceptable with prior art glass tempering apparatus employed in the manufacture of large size glass panels, such as automobile rear windows. The undesirable effects introduced by oscillation are more than directly proportional to the diameter of oscillation, so that to be able approximately to halve the diameter of oscillation, more than halves the undesirable effects that result from oscillation. In fact, at a diameter of about one and a half inches and below many of the oscillation difficulties lose much of their significance, so that, except for the mechanical simplicity that would result from the building of tempering apparatus without provision for oscillation, reduction of the oscillation diameter below one inch is not of great significance. It may even be desirable always to retain some small oscillation to overcome any localized shielding effects that parts of the mould may have on the air project from the lower blowing frame onto the underside of the glass. The necessity for this will depend on the nature and size of the mould as indicated above.

Notwithstanding this substantially complete coverage of the surface of the glass by the present arrangement, a comparatively wide area for escape of air is provided between each pair of adjacent pipes 10.

All the above considerations make the assumption, as they must if useable results are to be obtained, that the area of glass under treatment is flat. This assumption is not, however, valid over the entire glass surface and some modification to the spacing and arrangement of the air pipes 10 is necessary in practice where the glass is curved sharply. This is evident from FIGURES 1 and 2, and from a separate simplified diagram (FIGURE 5) that has been provided to illustrate this aspect of the apparatus. This diagram shows the upper and lower series of air pipes 10 arranged to be all equidistant from a surface of the glass A. It has been found that the best practical apporoximation to the theoretically calculated pipe spacing is obtained, if each of the pipes 10 is so translated (by movement of its associated spindle 24) and so rotated (by manual adjustment within the sockets 11) that the lines of intersection of the adjacent glass surface and the Y planes (the planes defined by the axes of the centre rows of nozzles) of the air pipes 10 are equally spaced from one another on the glass surface. FIGURE 5 shows such lines L1, L2, L3 etc. to L25 on the upper surface of the glass A, and similar lines L26, L27, L28 etc. to L50 on the lower surface. The distance from line L1 to line L2 is equal to the distance between lines L2 and L3 and so on. This will inevitably result in some crowding of the pipes 10 above the sharp bends in the glass, but it has been found in practice that, by reason of the much improved general pipe spacing afforded by the present pipe construction, this crowding can be tolerated without danger of snuffing.

This application is a continuation-in-part of application Serial No. 592,112, filed June 18, 1956, now U.S. Patent No. 2,968,126.

I claim:

1. Glass tempering apparatus comprising a pair of spaced blowing frames, means for supporting a curved glass sheet intermediate said frames, a plurality of feeder pipes slidably mounted in spaced pairs in each frame, fluid supply means connected to each feeder pipe to supply tempering fluid under pressure thereto, each feeder pipe having an inner extremity in closely spaced relation to the position occupied by a curved glas sheet, a combination union and socket means at each said inner extremity, a plurality of substantially parallel air supply pipes, each air supply pipe being pivotally connected at its ends to a pair of feeder pipes through the combination union and socket means at the inner extremities of the two feeder pipes comprising one of said spaced pairs of feeder pipes, and means interconnecting each spaced pair of feeder pipes to one of said frames for movement of said spaced pair of feeder pipes in unison and independently of movement of each other spaced pair of feeder pipes toward and away from the space between said spaced frames and for locking said spaced pair of feeder pipes in position relative to said frame, each air supply pipe having a plurality of spaced, aligned apertures extending through a wall thereof, whereby each air supply pipe is capable of being positioned independently of each other air supply pipe to form opposing sets of air supply pipes conforming in shape to the shape of the bent glass sheet and whereby each air supply pipe is pivotable about its own longitudinal axis into an orientation such that its apertures are oriented at a desired angle with respect to the portion of the surface of the bent glass sheet it opposes.

2. Glass tempering apparatus as in claim 1, wherein certain of said air supply pipes are spaced from adjacent air pipes by different distances and are oriented relative to one another in such a manner that the plane defined by the axes extending through said plurality of spaced, aligned apertures of each of said air supply pipes is substantially equally spaced from the adjacent planes defined by the axes extending through the corresponding plurality of spaced, aligned apertures of the air supply pipes adjacent to said each of said air supply pipes on the adjacent surface of said bent glass sheet occupying said position.

References Cited in the file of this patent

UNITED STATES PATENTS

| | | |
|---|---|---|
| 1,178,813 | Lloyd | Apr. 11, 1916 |
| 1,518,705 | Raum | Dec. 9, 1924 |
| 2,078,541 | Monnier | Apr. 27, 1937 |
| 2,080,083 | Magnein | May 11, 1937 |
| 2,250,628 | Forbes | July 29, 1941 |
| 2,265,308 | Perry et al. | Dec. 9, 1941 |
| 2,271,373 | Long | Jan. 27, 1942 |
| 2,298,709 | Long | Oct. 13, 1942 |
| 2,411,701 | Weihs | Nov. 26, 1946 |
| 2,743,136 | Auer | Apr. 24, 1956 |
| 2,804,339 | Barbour | Aug. 27, 1957 |
| 2,876,592 | Black et al. | Mar. 10, 1959 |

FOREIGN PATENTS

| | | |
|---|---|---|
| 626,078 | Germany | Feb. 20, 1936 |
| 471,813 | Great Britain | Sept. 10, 1937 |